United States Patent [19]

Sachs

[11] Patent Number: 5,336,846
[45] Date of Patent: Aug. 9, 1994

[54] CABLE CLAMP HAVING LOOP-FORMING WEDGE

[76] Inventor: Isaac Sachs, 283 Newton, Dollard-Des-Ormeaux, Quebec, Canada, H9A 3G1

[21] Appl. No.: 904,147

[22] Filed: Jun. 25, 1992

[51] Int. Cl.⁵ .......................... H02G 7/00; F16L 3/00
[52] U.S. Cl. .......................... 174/40 CC; 174/40 R; 24/136 R; 24/136 K; 248/63; 403/374
[58] Field of Search ............. 174/40 CC, 40 R, 41; 24/115 M, 136 K, 136 R, 132 WL; 248/63, 74.5; 403/373, 374

[56] References Cited

U.S. PATENT DOCUMENTS

| 421,120 | 2/1890 | Young | 248/63 X |
|---|---|---|---|
| 1,380,800 | 6/1921 | Haworth | 403/374 X |
| 1,759,591 | 5/1930 | Pleister et al. | 24/115 M |
| 2,781,212 | 2/1957 | Jugle | 24/115 M X |
| 3,905,711 | 9/1975 | Rogers | 24/115 M X |
| 3,960,461 | 6/1976 | Sachs | 403/374 X |
| 4,362,288 | 12/1982 | Allen | 24/115 M X |
| 4,407,471 | 10/1983 | Wilmsmann et al. | 24/136 R X |

FOREIGN PATENT DOCUMENTS

| 0357674 | 11/1905 | France | 24/136 K |
|---|---|---|---|
| 0492439 | 7/1919 | France | 24/136 K |
| 1108346 | 1/1956 | France | 24/136 K |
| 1153147 | 4/1985 | U.S.S.R. | 24/115 M |

*Primary Examiner*—Lincoln Donovan
*Assistant Examiner*—Hyung S. Sough
*Attorney, Agent, or Firm*—Longacre & White

[57] ABSTRACT

A cable clamp for holding a cable suspended from a support comprises a shell member having a mouth opening for the passage of the cable and first and second elongated inner abutment surfaces against which first and second portions of the cable received through the mouth opening are adapted to bear. The shell member also has a planar wall and a side opening defined by elongated walls which extend transversely to the planar base wall. A movable wedge is attached to the planar base wall for limited guided movement and retention within the shell member. The wedge is attached to the shell member by a tongue, which projects outwardly from the base wall and into a guide slot formed in a side wall of the wedge.

23 Claims, 5 Drawing Sheets

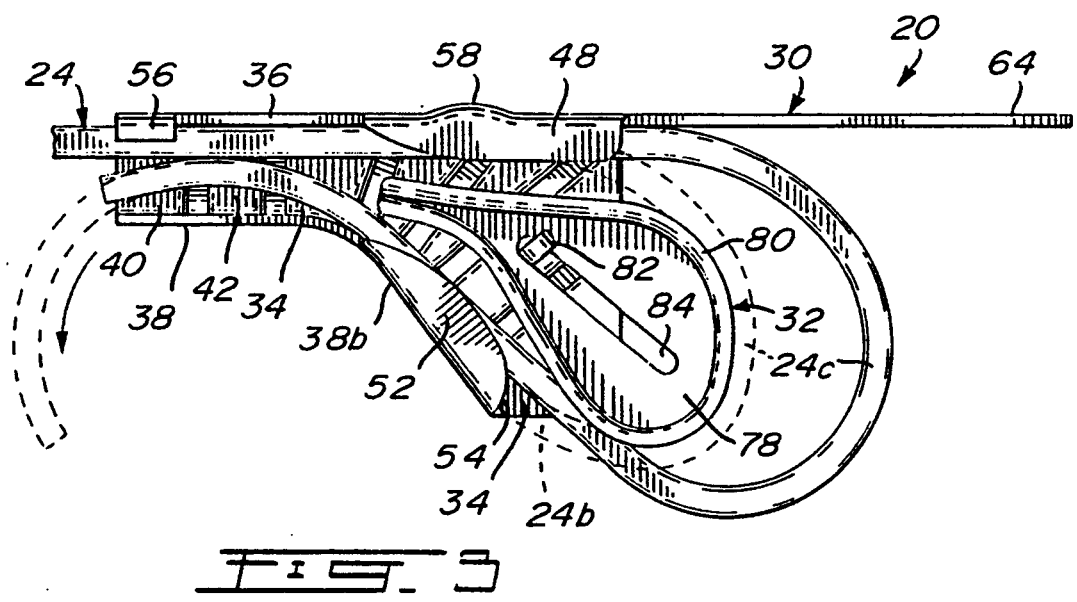
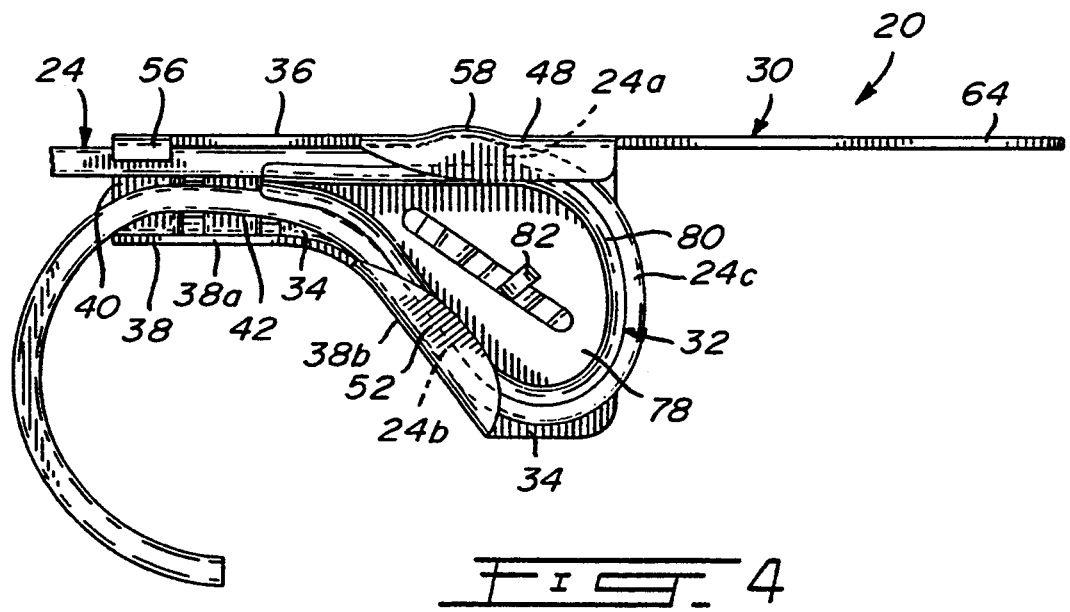
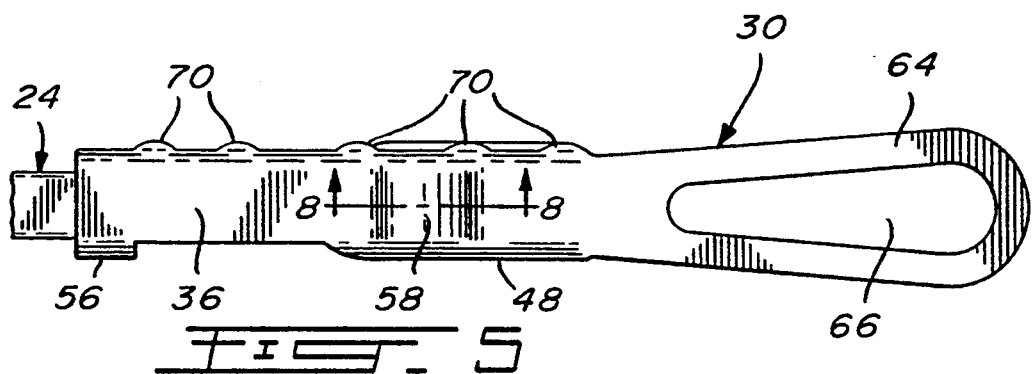

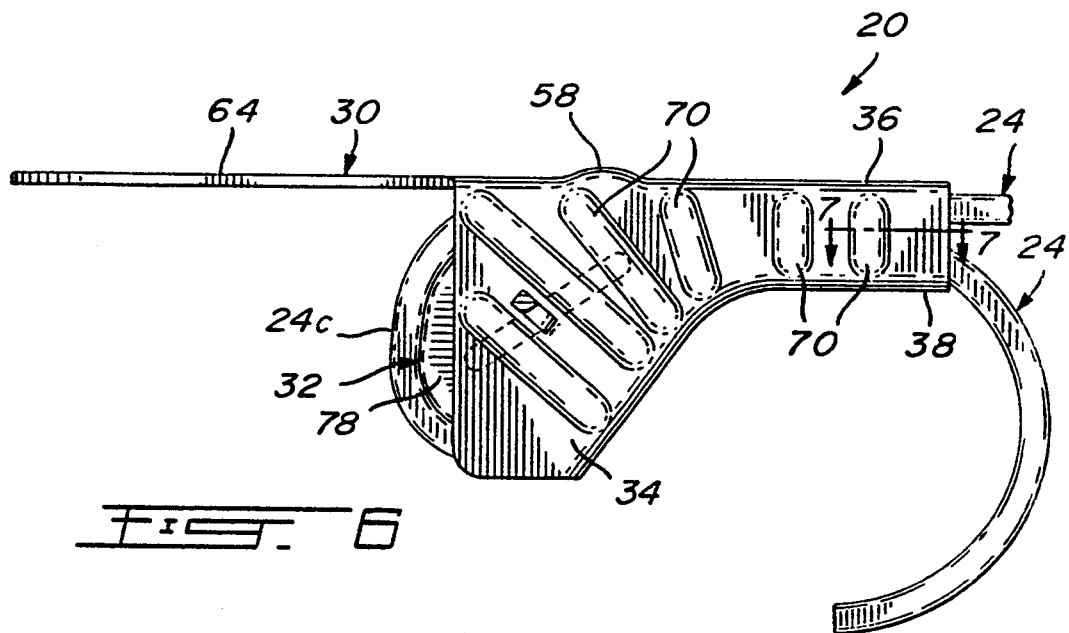
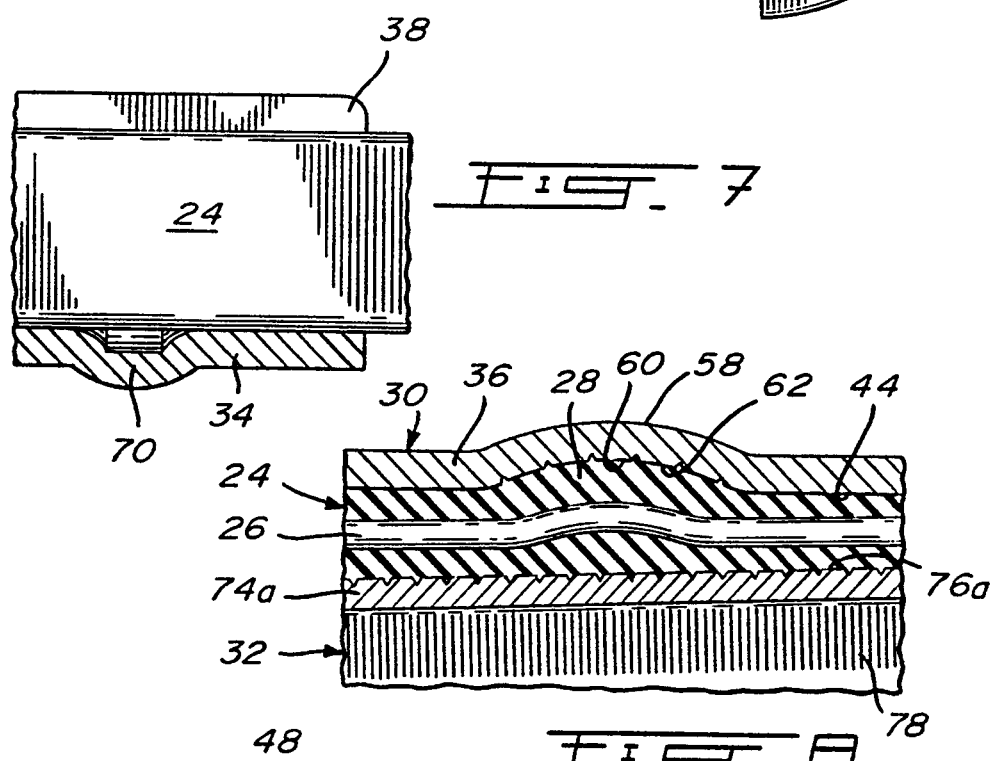
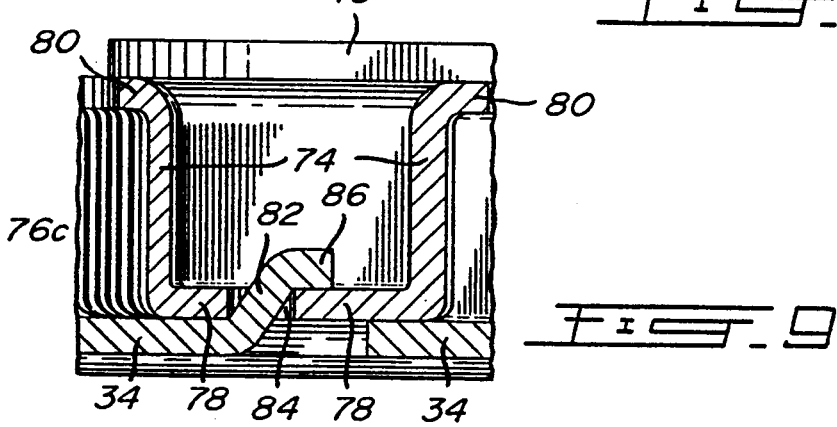

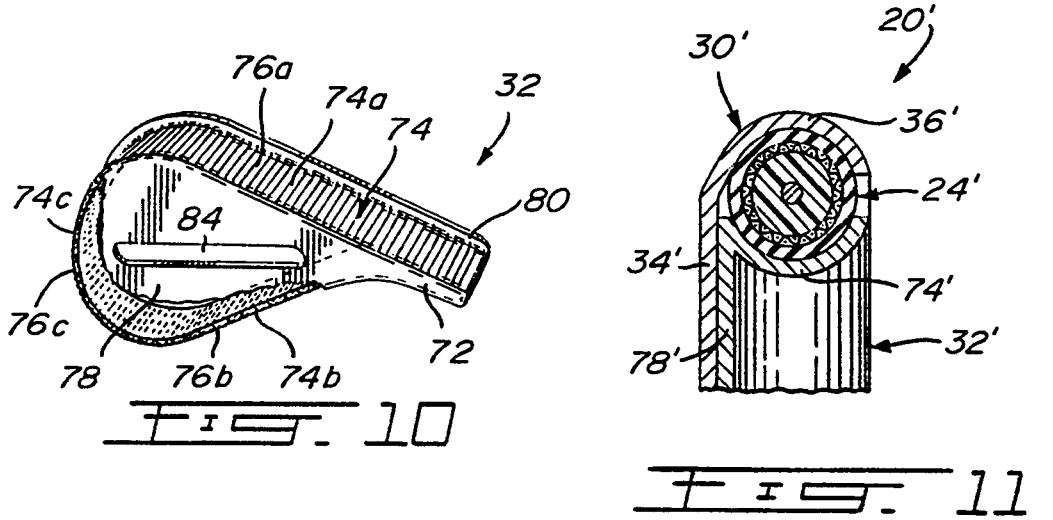
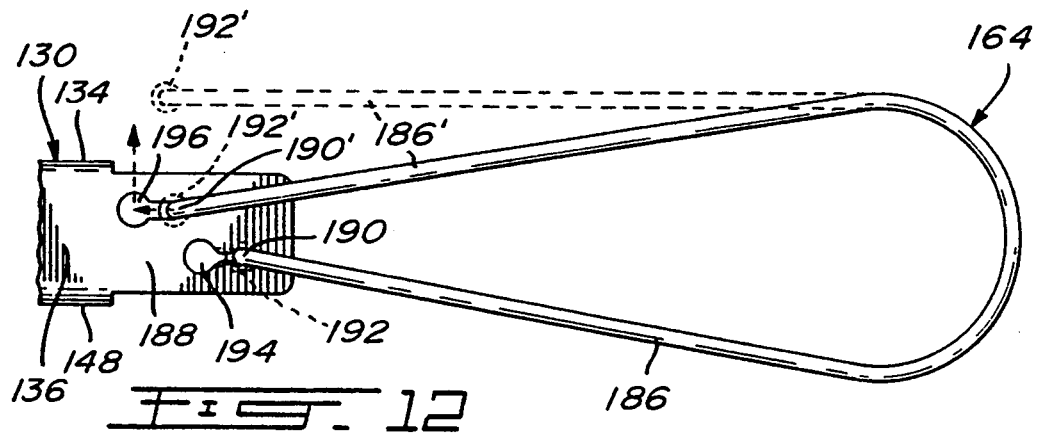
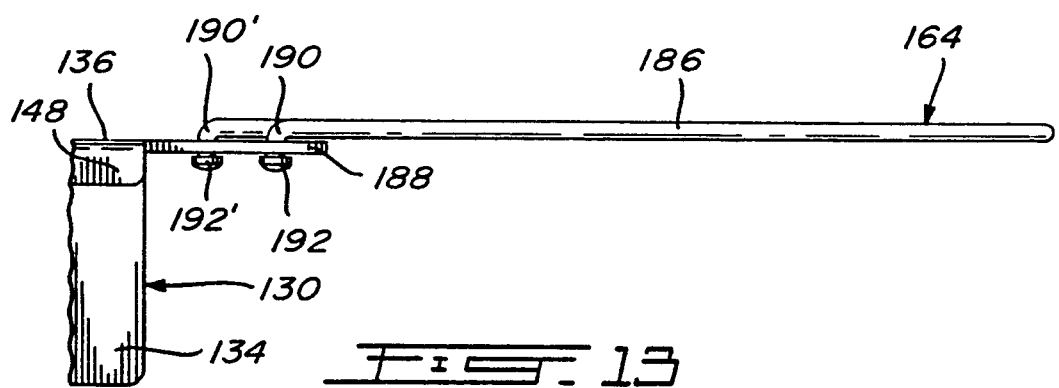

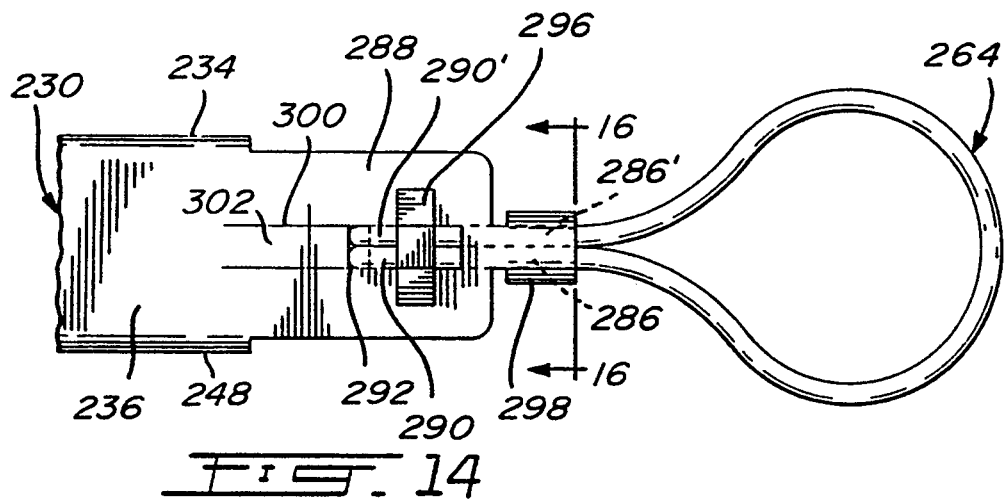
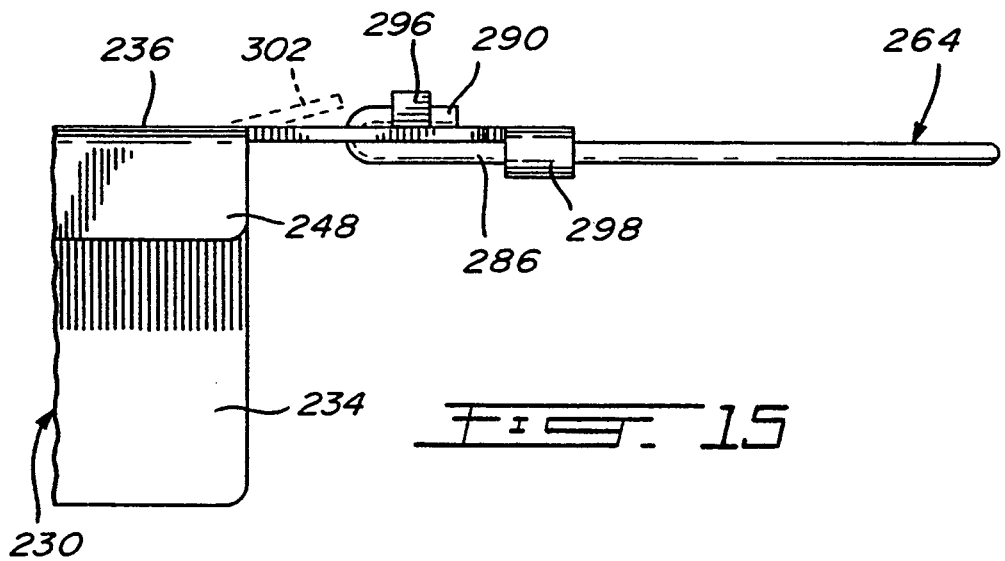
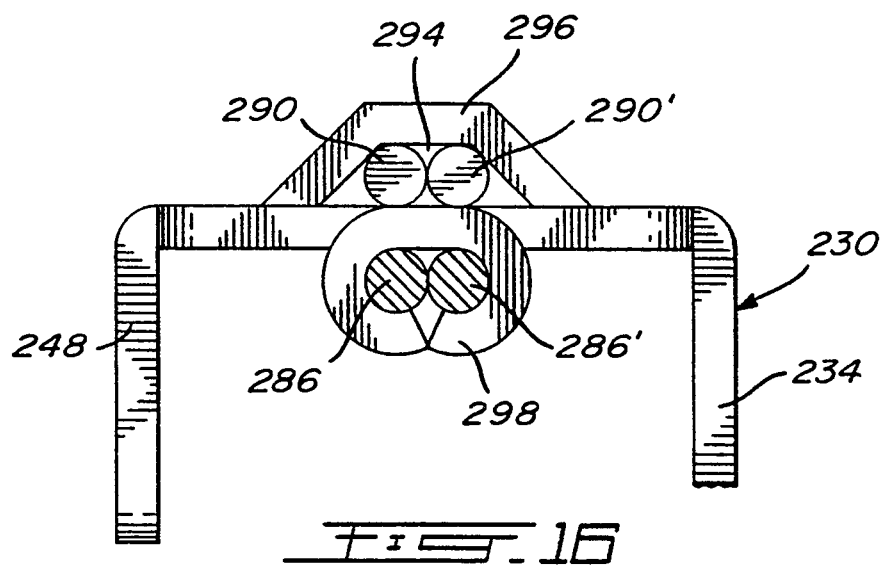

CABLE CLAMP HAVING LOOP-FORMING WEDGE

BACKGROUND OF THE INVENTION

The present invention relates to improvements in the field of drop cable clamps. More particularly, the invention is directed to an improved wedge clamp for holding a cable suspended from a support.

Applicant has already described in U.S. Pat. No. 3,960,461 a drop cable clamp for suspending a coaxial television cable from a support while providing a loose cable portion extending from the clamp. Such a drop clamp comprises a conical body member formed with a longitudinal outer groove having a depth smaller than the diameter of the cable for receiving the cable such as to leave a cable portion protruding therefrom, and a conical wedge sleeve for mounting over the body member and formed with a longitudinal slot for passing the cable therethrough. The conical body member is also provided at its smaller end with means for connecting it to the support. Thus, in use, the wedge sleeve is mounted over the body member with the slot in axial alignment with the groove, the cable is inserted in the groove through the slot and the sleeve is rotated over the body member to clamp the cable therebetween.

The drop cable clamp of the type described above is generally capable of sustaining a load up to about 500 pounds. However, when it is desired to hold a multi-wire cable such as a telephone aerial cable, suspended from a support, the increased number of wires in the cable adds to the weight of the cable so that the load may exceed 500 pounds and reach 750 pounds or more, causing the sleeve of the drop clamp to open up and/or the sidewall of the body member to collapse. In addition, the longer the suspended cable is, the greater is the pull exerted by the cable. Adverse weather conditions also contribute to increasing the pull exerted by the cable on the clamp, thus increasing the load sustained by the clamp.

SUMMARY OF THE INVENTION

It is therefore an object of this invention to overcome the above drawbacks and to provide an improved drop cable clamp having a high load capacity.

It is another object of the invention to provide a cable clamp which can be used for holding multi-wire cables suspended from a support.

In accordance with the present invention, there is thus provided a cable clamp for holding a cable suspended from a support, comprising a shell member having a mouth opening for the passage of the cable, first and second elongated inner abutment surfaces against which first and second portions of the cable received through the mouth opening are adapted to bear, the first and second inner abutment surfaces being disposed in opposed, spaced-apart facing relationship to each other and extending along respective longitudinal axes which intersect one another at an acute angle; and a movable wedge member having first and second outer abutment surfaces cooperating with the first and second inner abutment surfaces, respectively, to wedge the first and second cable portions, and a third outer abutment surface intermediate the first and second outer abutment surfaces. When the cable is passed through the mouth opening and looped about the wedge member so as to extend in a direction towards the mouth opening with the first and second cable portions extending between the first inner and outer abutment surfaces and the second inner and outer abutment surfaces, respectively, and the cable is pulled in such a direction, a loop portion of the cable intermediate the first and second cable portions engages the third outer abutment surface to thereby move the wedge member from a non-wedging position to a wedging position whereat the first and second cable portions are clamped between the first inner and outer abutment surfaces and the second inner and outer abutment surfaces, respectively. The cable clamp of the invention further includes attachment means for attaching the shell member to the support such that the shell member is spaced from the support.

According to a preferred embodiment, the first and second outer abutment surfaces of the wedge member are elongated and extend along respective longitudinal axes which intersect one another at an angle substantially equal to the aforesaid acute angle such that when the wedge member is in the wedging position, the first and second outer abutment surfaces extend substantially parallel to the first and second inner abutment surfaces, respectively. Preferably, the third outer abutment surface of the wedge member is curved to permit substantially full contact engagement thereof by the loop portion of the cable.

In a particularly preferred embodiment of the invention, the shell member comprises a planar base wall and first and second elongated walls extending transversely of the base wall and in opposed spaced-apart relation to one another to define at one end the mouth opening, the first and second walls including the first and second inner abutment surfaces, respectively. The first wall extends along a longitudinal axis which is coaxial with the longitudinal axis of the first inner abutment surface. The second wall comprises a first wall portion extending parallel to the first wall and defining together with the first wall and the base wall an elongated throat passage adjacent the mouth opening, and a second wall portion disposed at the aforesaid acute angle relative to the first wall portion, the second wall portion including the second inner abutment surface.

Preferably, a first guide flange extends along a longitudinal edge of the first wall, the first guide flange being substantially coextensive with the first inner abutment surface and guiding the first cable portion while preventing lateral displacement of same. The first wall together with the base wall and the first guide flange define a first channel for receiving the first cable portion, which channel merges into the throat passage. A second guide flange also extends along a longitudinal edge of the second wall portion, the second guide flange being substantially coextensive with the second inner abutment surface and guiding the second cable portion while preventing lateral displacement of same. The second wall portion together with the base wall and the second guide flange define a second channel for receiving the second cable portion, the second channel merging into the throat passage.

According to another preferred embodiment, the wedge member is slidably mounted on the base wall of the shell member for sliding movement between the wedging and non-wedging positions. The wedge member has a lead end and comprises an elongated peripheral wall having first and second surface portions converging towards the lead end, and a third curved surface portion intermediate the first and second surface portions, the first, second and third surface portions defining the aforesaid first, second and third outer abutment surfaces, respectively. The wedge member further includes a planar sidewall extending inwardly from one longitudinal edge of the peripheral wall, substantially parallel to and adjacent the base wall of said shell member. Preferably, a guide flange extends continuously along the other longitudinal edge of the peripheral wall, for guiding the first and second cable portions and the cable loop portion while preventing lateral displacement of same.

The cable clamp of the invention advantageously includes guide means for guiding the wedge member during movement thereof between the wedging and non-wedging positions. Such guide means preferably comprises a tongue projecting outwardly from the base wall of the shell member and a guide slot formed in the sidewall of the wedge member, the tongue extending through the guide slot for limited guided movement and retention of the wedge member within the shell member.

The attachment means, on the other hand, preferably comprises an elongate hooking member extending outwardly from the other end of the first wall and substantially along the longitudinal axis thereof.

The cable clamp according to the invention has a load capacity exceeding 750 pounds pull and can thus be used for holding multi-wire cables suspended from a support, such as a pole. Since the wedge member has a self-wedging action, the cable clamp of the invention is easy to install and facilitates slack adjustment for proper cable tensioning.

BRIEF DESCRIPTION OF THE DRAWINGS

Further features and advantages of the invention will become more readily apparent from the following description of preferred embodiments as illustrated by way of example in the accompanying drawings, in which:

FIGS. 2, 3 and 4 are side elevation views showing how the cable is inserted inside the clamp and retained in clamping engaging therein;

FIG. 5 is a top plan view of the cable clamp;

FIG. 6 is a side elevation view showing the other side of the cable clamp;

FIG. 7 is a sectional view taken along line 7—7 of FIG. 6;

FIG. 8 is another sectional view taken along line 8—8 of FIG. 5;

FIG. 9 is a further sectional view taken along line 9—9 of FIG. 2;

FIG. 10 is a perspective view of the wedge member of the cable clamp illustrated in FIG. 1;

FIG. 11 is a fragmentary sectional view of a cable clamp according to another preferred embodiment of the invention, adapted for clamping a cable of circular cross-section;

FIG. 12 is a fragmentary top plan view illustrating the hooking end of a cable clamp according to a further preferred embodiment of the invention;

FIG. 13 is a fragmentary sideview of the embodiment illustrated in FIG. 12;

FIG. 14 is a fragmentary top plan view illustrating the hooking end of a cable clamp according to yet another preferred embodiment of the invention;

FIG. 15 is a fragmentary sideview of the embodiment illustrated in FIG. 14; and

FIG. 16 is a fragmentary sectional view taken along line 16—16 of FIG. 14.

DESCRIPTION OF PREFERRED EMBODIMENTS

Figure 1:
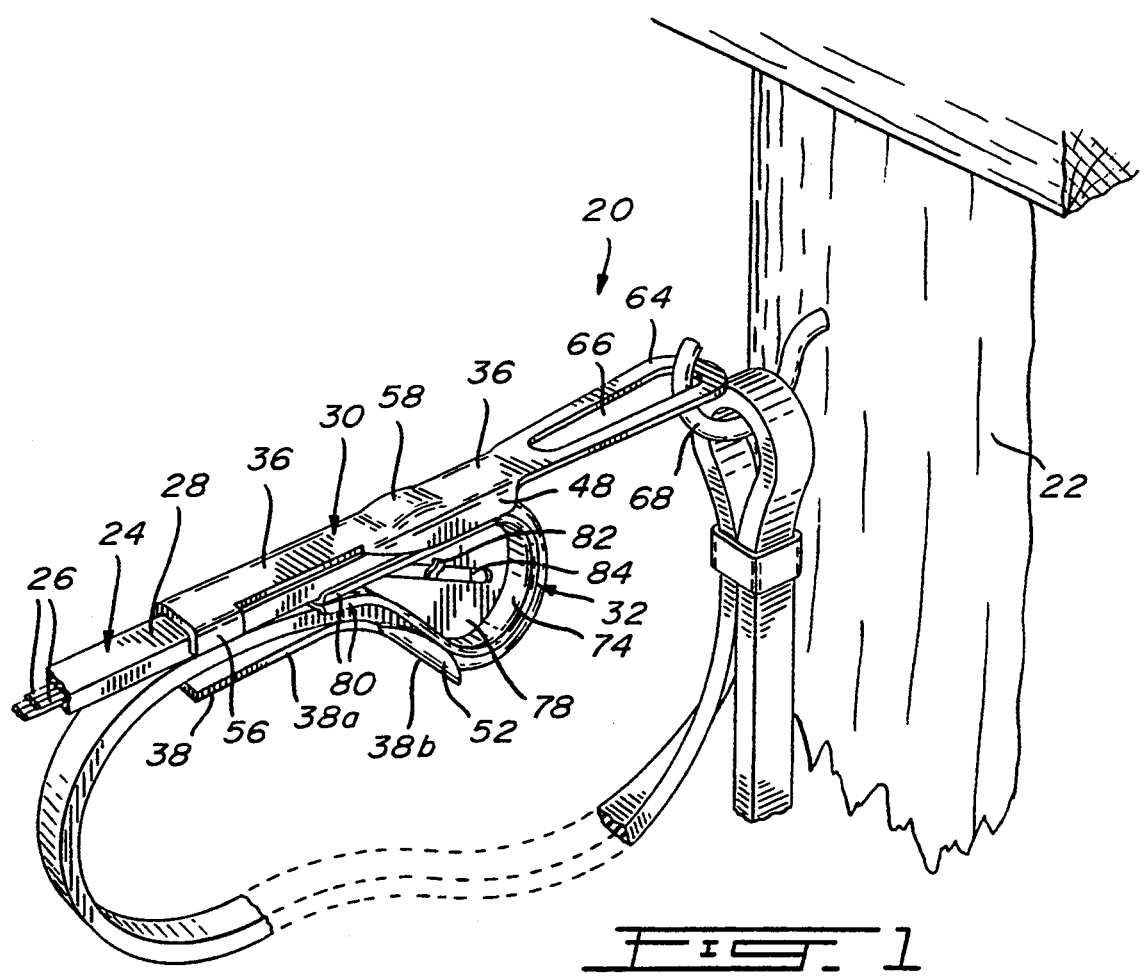
FIG. 1 is a perspective view of a cable clamp according to a preferred embodiment of the invention, as seen holding a multi-wire cable suspended from a pole.

Referring to the drawings, and more particularly to FIGS. 1-10, there is illustrated in FIG. 1 a cable clamp which is generally designated by reference numeral 20 and seen hooked to a pole 22, holding a multi-wire cable 24 suspended therefrom. The cable 24 is typically a telephone aerial cable of rectangular cross-section, which comprises a plurality of longitudinal extending wires 26 covered with a sheath 28 of plastic material.

The cable clamp 20 comprises two main components: a shell member 30 and a movable wedge member 32 mounted inside the shell member 30. The shell member 30 includes a planar base wall 34 and upper and lower elongated walls 36,38 extending at right angle to the base wall 34 and in opposed spaced-apart relation to one another to define at one end a mouth opening 40 for the passage of the cable 24. The lower wall 38 has a first wall portion 38a extending parallel to the upper wall 36 and defining together with the walls 34 and 36 an elongated throat passage 42 adjacent the mouth opening 40, and a second wall portion 38b disposed at an angle of about 50° relative to the first wall portion 38a.

The wall 36 and wall portion 38b have respective elongated inner abutment surfaces 44 and 46 against which cable portions 24a and 24b are adapted to bear. The abutment surfaces 44 and 46 are disposed in opposed, spaced-apart facing relationship to one another and extend along respective longitudinal axes which intersect one another at an angle of about 50°. A first guide flange 48 extends along the side edge of upper wall 36 and parallel to the base wall 34, the flange 48 being substantially coextensive with the abutment surface 44 and defining together with the walls 34,36 a channel 50 for receiving the cable portion 24a. A second guide flange 52 extends along the side edge of wall portion 38b and parallel to the base wall 34, the flange 52 being also substantially coextensive with the abutment surface 46 and defining together the wall 34 and wall portion 38b a channel 54 for receiving the cable portion 24b. Both channels 50 and 54 merge into the throat passage 42. A guide tab 56 extends from the side edge of wall 36 and parallel to the base wall 34 for guiding the cable 24 through the mouth opening 40.

A convexly curved protrusion 58 extends from the upper wall 36 and defines a corresponding recess 60 in the abutment surface 44, as best shown in FIG. 8. The recess 60 has a concavely curved, serrated surface 62. The wall 36 is extended rearwardly along the longitudinal axis thereof to define an elongate hooking member 64. In the embodiment illustrated in FIGS. 1-6, the hooking member 64 is integral with the wall 36 and is formed with a loophole 66 for engaging a hook 68 or other similar fastener. The base wall 34 of the shell member 30 is provided with a plurality of spaced-apart reinforcing ribs which are formed by punching, as best shown in FIGS. 5-7.

The wedge member 32 has a lead end 72 and comprises an elongated peripheral wall 74 having first and second wall portions 74a and 74b converging towards the lead end 72, and a third curved wall portion 74c intermediate the wall portions 74a and 74b, as best shown in FIG. 10. The wall portions 74a and 74b extend along respective longitudinal axes which intersect one another at an angle of about 50°. The wall portions 74a, 74b and 74c define outer surface portions 76a, 76b and 76c, respectively; as shown, the surface portions 76c, 76b and 76c are serrated. A planar sidewall 78 extend inwardly from one side edge of the peripheral wall 74, substantially parallel to and adjacent the base wall 34 of the shell member 30. A guide flange 80 extends continuously along the other side edge of the peripheral wall 74. The outer surface portions 76a and 76b of the wedge member 32 cooperate with the inner surfaces 44 and 46, respectively, of the shell member 30 to wedge the cable portions 24a and 24b.

Figure 2:
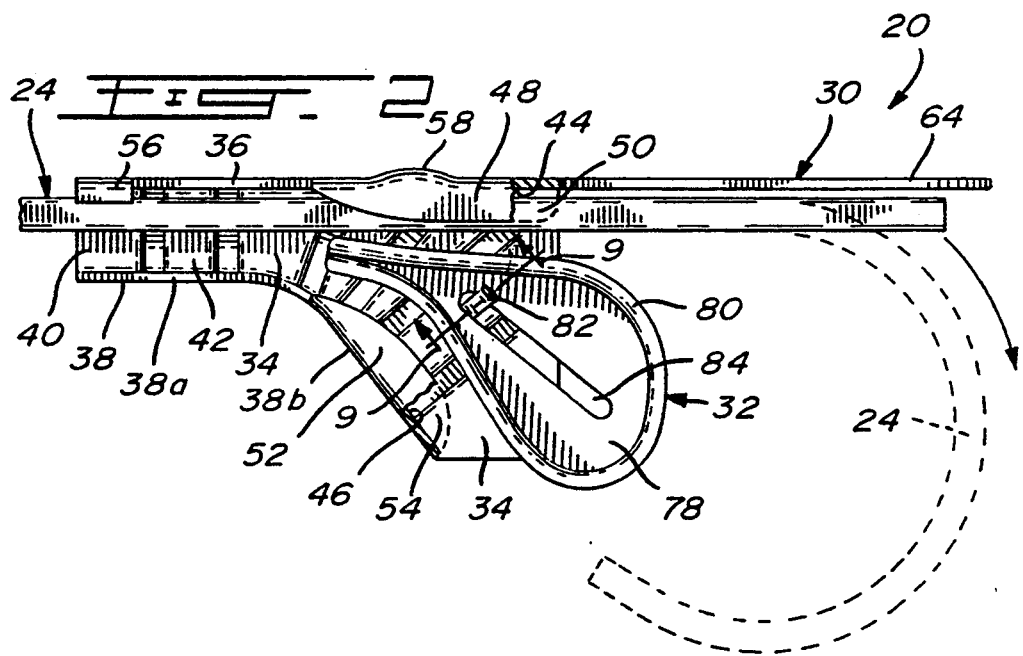

The wedge member 32 is slidably mounted on the base wall 34 of the shell member 30 for sliding movement between the non-wedging position illustrated in FIG. 2 and the wedging position illustrated in FIG. 4. To this end, the base wall 34 is provided with an outwardly projecting tongue 82 which extends through a slot 84 formed in the sidewall 78 of the wedge member 32. As shown in FIG. 9, the tongue 82 is inclined relative to the base wall 34 and has an end portion 86 which extends parallel to the sidewall 78 and is in sliding contact engagement therewith. The tongue 82 and slot 84 thus serve to guide the wedge member 32 during movement thereof between the wedging and non-wedging positions, while retaining the wedge member 32 mounted on the base wall 34 of the shell member 30. Movement of the wedge member 32 is limited by the length of the slot 82.

In order to clamp the cable 24 using the clamp 20, the cable 24 is passed through the mouth opening 40 and throat passage 42 and into the channel 50 so as to extend rearwardly beyond the wedge member 32, as shown in FIG. 2. The cable 24 is then looped about the wedge member 32 so as to extend in a direction towards the mouth opening 40, and passed into the channel 54 and again through the throat passage 42 to exit through the opening 40, as shown in FIG. 3. By pulling the cable 24 exiting through the opening 40, the loop portion 24c engages the outer surface portion 76c of wedge member 32 to thereby move the wedge member 32 from the non-wedging position illustrated in FIG. 3 to the wedging position illustrated in FIG. 4, whereat the cable portion 24a is clamped between the inner abutment surface 44 of shell member 30 and the outer surface portion 76a of wedge member 32, and the cable portion 24b is clamped between the inner abutment surface 46 of shell member 30 and the outer surface portion 76b of wedge member 32.

Since the cable portion 24a is compressed between the surface 44 and surface portion 76a by the wedge member 32, a portion of the sheath 28 penetrates into the recess 60, as shown in FIG. 8; the recess 60 thus defines a cable arresting means preventing longitudinal displacement of the cable 24 when the wedge member 32 is in the wedging position. The slip-preventing serrations which are formed in the surface 62 as well as in the surface portions 76a, 76b and 76c also contribute to prevent longitudinal displacement of the cable 24. The flanges 48, 52 and 80, on the other hand, prevent lateral displacement of the cable. Since the mouth opening 40 and throat passage 42 together with the passages defined between the flanges 48,52 and the wedge member 32 in the non-wedging position define a Y-shaped side opening, it is also possible to first form a loop with the cable 24 and then insert the loop sideways directly into the side opening, around the wedge member 32.

FIG. 11 illustrates a cable clamp 20' according to another embodiment of the invention, which is adapted to clamp a cable 24' of circular cross-section, such as a coaxial TV cable. As shown, the upper wall 36' which extends transversely of the base wall 34' of shell member 30' has a semi-circular cross-section. Similarly, the peripheral wall 74' which extends transversely of the sidewall 78' of wedge member 32' has a semi-circular cross-section. The walls 36' and 74' cooperate to clampingly engage the cable 24' received therebetween. Although not illustrated, the lower wall of shell member 30' has the same cross-section as the upper wall 36'.

Instead of using a hooking member 64 which is integral with the upper wall 36 of shell member 30, it is possible to use a metallic wire 164 which is bent to define a hooking loop, as shown in FIGS. 12 and 13. The legs 186,186' of the bent wire 164 are connected to an extension 188 which projects rearwardly from the shell member 130 and extends along the longitudinal axis of the upper wall 136. Leg 186 which is shorter than leg 186' is fixedly connected to the extension 188, whereas leg 186' is releasably connected. The legs 186,186' have right angled end portions 190,190' provided with beaded heads 192,192'. The end portion 190 of leg 186 extends through the restricted passage of a keyhole-shaped slot 194, where it is retained captive by material punched to form a pair of opposed stop lugs partially closing the passage, as shown in FIG. 12. The end portion 190' of leg 186' also extends through the restricted passage of a keyhole-shaped slot 196, but may be removed by passing the beaded head 192' through the eye portion of the slot 196, as shown in FIG. 12. Such an arrangement enables the leg 186' to be disconnected from the extension 188 for passage through the opening of an eyebolt or like fastener. In FIGS. 12 and 13, reference numeral 134 designates the base wall of shell member 130 and reference numeral 148 the flange of wall 136.

In the embodiment illustrated in FIGS. 14–16, a metallic wire 264 is also bent to define a hooking loop, but the legs 286,286' of the bent wire are both fixedly secured to the extension 288 which projects rearwarly from the shell member 230 and extends along the longitudinal axis of the upper wall 236. The legs 286,286' extend in close parallel relation to one another and have end portions 290,290' extending through an aperture 292 formed in the extension 288. Both end portions 290,290' are bent backwards so as to extend through a cavity 294 defined by a punched bridge portion 296. The end portions 290,290' are thus retained captive in the cavity 294 by the bridge portion 296. The legs 286,286' are also secured to the extension 288 by a retention collar 298. A U-shaped slit 300 is formed in the extension 288 to provide a tongue 302 which may be bent upwardly as shown in broken line in FIG. 25, to enlarge the aperture 292 for permitting passage of the end portions 290,290' of legs 286,286'. In FIGS. 14–16, reference numeral 234 designates the base wall of shell member 230 and reference numeral 248 the flange of wall 236.

I claim:
1. A cable clamp for holding a cable suspended from a support, comprising:
  a shell member having a planar base wall and first and second elongated walls extending transversely of said base wall and in opposed spaced-apart relation to one another to define at one end a mouth opening for the passage of said cable, said first and sec- ond elongated walls defining a side opening in said shell member, said first and second walls including respectively first and second elongated inner abutment surfaces against which first and second portions of said cable are adapted to bear, said first and second inner abutment surfaces extending along respective longitudinal axes which intersect one another at an acute angle;

a movable wedge member having first and second outer abutment surfaces cooperating with said first and second inner abutment surfaces, respectively, adapted to cooperate for wedging said first and second cable portions, and a third outer abutment surface intermediate said first and second outer abutment surfaces, said wedge member being slidably mounted on the base wall of said shell member for sliding movement between a non-wedging position and a wedging position whereat said first and second cable portions are adapted to be clamped between said first inner and outer abutment surfaces and said second inner and outer abutment surfaces, respectively, said wedge member further including a planar side wall extending substantially parallel to and adjacent said base wall;

means for guiding said wedge member during movement thereof between said wedging and non-wedging positions, said means for guiding said wedge member comprising a tongue projecting outwardly from the base wall of said shell member and a guide slot formed in the side wall of said wedge member, said tongue extending through said guide slot for limited guided movement and retention of said wedge member within said shell member so as to permit said cable to be inserted sideways into said shell member through said side opening when said wedge member is in said non-wedging position, and be looped about said wedge member so as to extend in a direction towards said mouth opening with said first and second cable portions extending between said first inner and outer abutment surfaces and said second inner and outer abutment surfaces, respectively, such that when said cable is pulled in said direction, a loop portion of said cable intermediate said first and second cable portions engages said third outer abutment surface to thereby move said wedge member from said non-wedging position to said wedging position; and attachment means for attaching said shell member to said support such that said shell member is spaced from said support.

2. A cable clamp as claimed in claim 1, wherein said first and second outer abutment surfaces of said wedge member are elongated and extend along respective longitudinal axes which intersect one another at an angle substantially equal to said acute angle such that when said wedge member is in said wedging position, said first and second outer abutment surfaces extend substantially parallel to said first and second inner abutment surfaces, respectively.

3. A cable clamp as claimed in claim 2, wherein said acute angle is equal to about 50°.

4. A cable clamp as claimed in claim 1, wherein said third outer abutment surface of said wedge member is curved to permit substantially full contact engagement thereof by said cable loop portion.

5. A cable clamp as claimed in claim 1, wherein said first wall extends along a longitudinal axis which is coaxial with the longitudinal axis of said first inner abutment surface.

6. A cable clamp as claimed in claim 5, wherein said second wall comprises a first wall portion extending parallel to said first wall and defining together with said first wall and said base wall an elongated throat passage adjacent said mouth opening, and a second wall portion disposed at said acute angle relative to said first wall portion, said second wall portion including said second inner abutment surface.

7. A cable clamp as claimed in claim 6, wherein a first guide flange extends along a longitudinal edge of said first wall for guiding said first cable portion while preventing lateral displacement of same, said first guide flange being substantially coextensive with said first inner abutment surface.

8. A cable clamp as claimed in claim 7, wherein said first wall together with said base wall and said first guide flange define a first channel for receiving said first cable portion, said first channel merging into said throat passage.

9. A cable clamp as claimed in claim 8 wherein a second guide flange extends along a longitudinal edge of said second wall portion for guiding said second cable portion while preventing lateral displacement of same, said second guide flange being substantially coextensive with said second inner abutment surface.

10. A cable clamp as claimed in claim 9, wherein said second wall portion together with said base wall and said second guide flange define a second channel for receiving said second cable portion, said second channel merging into said throat passage.

11. A cable clamp as claimed in claim 1, wherein said shell member is provided with cable arresting means for preventing longitudinal displacement of said cable when said wedge member is in said wedging position.

12. A cable clamp as claimed in claim 11, wherein a recess is formed in said first inner abutment surface, said recess having a concavely curved surface and defining said cable arresting means, whereby when said wedge member is in said wedging position a sheath portion of said first cable portion penetrates into said recess, thereby preventing longitudinal displacement of said cable.

13. A cable clamp as claimed in claim 12, wherein slip-preventing serrations are formed in the concavely curved surface of said recess for engaging the sheath portion of said first cable portion.

14. A cable clamp as claimed in claim 1, wherein a guide tab extends from a longitudinal edge of said first wall adjacent said one end, for guiding said cable through said mouth opening.

15. A cable clamp as claimed in claim 1, wherein said wedge member has a lead end and comprises an elongated peripheral wall having first and second surface portions converging towards said lead end, and a third curved surface portion intermediate said first and second surface portions, said first, second and third surface portions defining said first, second and third outer abutment surfaces, respectively.

16. A cable clamp as claimed in claim 15, wherein slip-preventing serrations are formed in said first, second and third surface portions of said peripheral wall for engaging said first and second cable portion and said cable loop portion.

17. A cable clamp as claimed in claim 15, wherein the sidewall of said wedge member extends inwardly from one longitudinal edge of said peripheral wall.

18. A cable clamp as claimed in claim 16, wherein a guide flange extends continuously along the other longitudinal edge of said peripheral wall, for guiding said first and second cable portions and said cable loop portion while preventing lateral displacement of same.

19. A cable clamp as claimed in claim 5, wherein said attachment means comprises an elongate hooking member extending outwardly from the other end of said first wall and substantially along the longitudinal axis thereof.

20. A cable clamp as claimed in claim 19, wherein said hooking member is integral with said first wall and formed with a loophole.

21. A cable clamp as claimed in claim 19, wherein said hooking member consists of a metallic wire bent to define a hooking loop and having the free ends thereof secured to said other end of said first wall.

22. A cable clamp as claimed in claim 21, wherein one of the free ends of said metallic wire is fixedly secured to said other end of said first wall, and the other free end of said metallic wire is removably secured to said other end of said first wall.

23. A cable clamp as claimed in claim 1, wherein the base wall of said shell member is provided with a plurality of spaced-apart reinforcing ribs.

* * * * *